US007701613B2

(12) United States Patent  
Doi

(10) Patent No.: US 7,701,613 B2  
(45) Date of Patent: Apr. 20, 2010

(54) IMAGE FORMING APPARATUS WITH RANDOM NUMBER GENERATOR

(75) Inventor: Toshihiro Doi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 532 days.

(21) Appl. No.: 11/678,820

(22) Filed: Feb. 26, 2007

(65) Prior Publication Data

US 2007/0206243 A1  Sep. 6, 2007

(51) Int. Cl.  
*H04N 1/40* (2006.01)  
*H04N 1/405* (2006.01)

(52) U.S. Cl. .................... 358/3.02; 358/3.06

(58) Field of Classification Search ........... 358/2.1, 358/3.01, 3.02, 3.03, 3.06, 3.13, 3.14, 3.16, 358/3.19  
See application file for complete search history.

(56) References Cited

U.S. PATENT DOCUMENTS

2004/0252182 A1   12/2004   Wakasugi

2005/0062831 A1   3/2005   Ishibashi et al.

FOREIGN PATENT DOCUMENTS

EP        1136272 A1 *   3/2001  
JP      2005-022410      1/2005

* cited by examiner

*Primary Examiner*—Benny Q Tieu  
*Assistant Examiner*—Eric A Rust  
(74) *Attorney, Agent, or Firm*—Rabin & Berdo, P.C.

(57) ABSTRACT

In an image forming apparatus which expresses lamp lighting energy corresponding to input gray scale data on the basis of on/off of lighting lamp of plural sub-dots corresponding to different lamp lighting times of different assistant scanning positions, with respect to such image that rapidly changes from a state close to white level toward a state close to black level, or with respect to such image that rapidly changes from a state close to black level toward a state close to white level, in order to decrease that a thin white stripe or a thin black stripe happens on the border portion, a random generator 34 and a adding circuit 33 are provided so that: whenever the gray scale value is inputted to the gray scale value input register 31, with respect to the lamp lighting energy, a random number of predetermined level is added.

14 Claims, 14 Drawing Sheets

| GRAY SCALE VALUE k | STANDARDIZATION EXPOSURE ENERGY es(k) | WEIGHT FACTOR 128 FOR SUB-LINE 7 | WEIGHT FACTOR 64 FOR SUB-LINE 6 | WEIGHT FACTOR 32 FOR SUB-LINE 5 | WEIGHT FACTOR 16 FOR SUB-LINE 4 | WEIGHT FACTOR 8 FOR SUB-LINE 3 | WEIGHT FACTOR 4 FOR SUB-LINE 2 | WEIGHT FACTOR 2 FOR SUB-LINE 1 | WEIGHT FACTOR 1 FOR SUB-LINE 0 |
|---|---|---|---|---|---|---|---|---|---|
| 0 | 0 | 0 | 0 | 0 | 0 | 0 | 0 | 0 | 0 |
| 1 | 63 | 0 | 0 | 1 | 1 | 1 | 1 | 1 | 1 |
| 2 | 87 | 0 | 1 | 0 | 1 | 0 | 1 | 1 | 1 |
| 3 | 102 | 0 | 1 | 1 | 0 | 0 | 1 | 1 | 0 |
| 4 | 113 | 0 | 1 | 1 | 1 | 0 | 0 | 0 | 1 |
| 5 | 122 | 0 | 1 | 1 | 0 | 1 | 0 | 1 | 0 |
| 6 | 131 | 1 | 0 | 0 | 0 | 0 | 0 | 1 | 1 |
| 7 | 139 | 1 | 0 | 0 | 1 | 1 | 0 | 1 | 1 |
| 8 | 146 | 1 | 0 | 1 | 0 | 0 | 0 | 1 | 0 |
| 9 | 154 | 1 | 0 | 1 | 0 | 1 | 0 | 1 | 0 |
| 10 | 162 | 1 | 1 | 0 | 1 | 0 | 1 | 0 | 1 |
| 11 | 171 | 1 | 1 | 0 | 0 | 0 | 0 | 0 | 1 |
| 12 | 181 | 1 | 1 | 1 | 1 | 1 | 1 | 1 | 0 |
| 13 | 192 | 1 | 1 | 0 | 0 | 0 | 0 | 0 | 0 |
| 14 | 214 | 1 | 1 | 0 | 1 | 1 | 1 | 1 | 0 |
| 15 | 254 | 1 | 1 | 1 | 1 | 1 | 1 | 1 | 0 |

|        | X1 | X2 | X3 | X4 | X5 | X6 | X7 | X8 | X9 | X10 |
|--------|----|----|----|----|----|----|----|----|----|-----|
| LINE 1 | 0  | 0  | 0  | 1  | 0  | 0  | 0  | 1  | 0  | 0   |
| LINE 2 | 0  | 1  | 1  | 0  | 1  | 0  | 0  | 0  | 0  | 1   |
| LINE 3 | 1  | 0  | 1  | 0  | 0  | 1  | 0  | 1  | 1  | 0   |
| LINE 4 | 1  | 1  | 0  | 1  | 0  | 0  | 1  | 0  | 0  | 0   |
| LINE 5 | 1  | 0  | 1  | 0  | 1  | 1  | 0  | 0  | 0  | 1   |
| LINE 6 | 0  | 1  | 1  | 1  | 0  | 1  | 1  | 0  | 1  | 1   |
| LINE 7 | 1  | 0  | 0  | 0  | 1  | 1  | 1  | 1  | 1  | 0   |
| LINE 8 | 0  | 0  | 1  | 0  | 1  | 0  | 0  | 0  | 1  | 1   |
| LINE 9 | 1  | 1  | 1  | 1  | 0  | 0  | 1  | 1  | 1  | 1   |

*FIG. 5*

| 54-1 | 54-2 | 54-3 | 54-5 | 54-6 | 54-7 | 54-8 |
|---|---|---|---|---|---|---|
| GRAY SCALE VALUE k | STANDARDIZATION EXPOSURE ENERGY es(k) | CENTER POSITION Wk IN ASSISTANT SCANNING DIRECTION | CENTER POSITION Wk* IN ASSISTANT SCANNING DIRECTION AFTER MODULATED | \|Wave - Wk\| | \|Wave - Wk*\| | WHETHER MODULATION CONTROL IS NECESSARY |
| 0 | 0 | — | — | — | — | × |
| 1 | 63 | 3.9 | 2 | 1.95 | 0.05 | ○ |
| 2 | 87 | 2.74 | 2.64 | 0.79 | 0.69 | ○ |
| 3 | 102 | 2.57 | 2.62 | 0.62 | 0.67 | × |
| 4 | 113 | 2.62 | 2.65 | 0.67 | 0.70 | × |
| 5 | 122 | 2.8 | 2.85 | 0.85 | 0.90 | × |
| 6 | 131 | 1.15 | 1.15 | 0.80 | 0.80 | ○ |
| 7 | 139 | 1.37 | 1.37 | 0.58 | 0.58 | ○ |
| 8 | 146 | 1.41 | 1.46 | 0.54 | 0.49 | ○ |
| 9 | 154 | 1.6 | 1.64 | 0.35 | 0.31 | ○ |
| 10 | 162 | 1.47 | 1.51 | 0.48 | 0.44 | ○ |
| 11 | 171 | 1.67 | 1.67 | 0.28 | 0.28 | ○ |
| 12 | 181 | 1.77 | 1.79 | 0.18 | 0.16 | ○ |
| 13 | 192 | 1.33 | 1.37 | 0.62 | 0.58 | ○ |
| 14 | 214 | 1.67 | 1.7 | 0.28 | 0.25 | ○ |
| 15 | 254 | 1.94 | 1.97 | 0.01 | 0.02 | × |

\* Wave IS SET TO 1.95
\* INTERVAL OF SUB-LINES IS SET TO 1

|        | X1 | X2 | X3 | X4 | X5 | X6 | X7 | X8 | X9 | X10 |
|--------|----|----|----|----|----|----|----|----|----|-----|
| LINE 1 | 3  | 3  | 3  | 3  | 3  | 3  | 3  | 3  | 3  | 3   |
| LINE 2 | 3  | 3  | 3  | 3  | 3  | 3  | 3  | 3  | 3  | 3   |
| LINE 3 | 3  | 3  | 3  | 3  | 3  | 3  | 3  | 3  | 3  | 3   |
| LINE 4 | 13 | 13 | 13 | 13 | 13 | 13 | 13 | 13 | 13 | 13  |
| LINE 5 | 13 | 13 | 13 | 13 | 13 | 13 | 13 | 13 | 13 | 13  |
| LINE 6 | 13 | 13 | 13 | 13 | 13 | 13 | 13 | 13 | 13 | 13  |
| LINE 7 | 3  | 3  | 3  | 3  | 3  | 3  | 3  | 3  | 3  | 3   |
| LINE 8 | 3  | 3  | 3  | 3  | 3  | 3  | 3  | 3  | 3  | 3   |
| LINE 9 | 3  | 3  | 3  | 3  | 3  | 3  | 3  | 3  | 3  | 3   |

*FIG. 10*

*PRIOR ART*

| | X1 | X2 | X3 | X4 | X5 | X6 | X7 | X8 | X9 | X10 |
|---|---|---|---|---|---|---|---|---|---|---|
| LINE 1 | 1 | 1 | 1 | 1 | 1 | 1 | 1 | 1 | 1 | 1 |
| LINE 2 | 1 | 1 | 1 | 1 | 1 | 1 | 1 | 1 | 1 | 1 |
| LINE 3 | 1 | 1 | 1 | 1 | 1 | 1 | 1 | 1 | 1 | 1 |
| LINE 4 | 13 | 13 | 13 | 13 | 13 | 13 | 13 | 13 | 13 | 13 |
| LINE 5 | 13 | 13 | 13 | 13 | 13 | 13 | 13 | 13 | 13 | 13 |
| LINE 6 | 13 | 13 | 13 | 13 | 13 | 13 | 13 | 13 | 13 | 13 |
| LINE 7 | 1 | 1 | 1 | 1 | 1 | 1 | 1 | 1 | 1 | 1 |
| LINE 8 | 1 | 1 | 1 | 1 | 1 | 1 | 1 | 1 | 1 | 1 |
| LINE 9 | 1 | 1 | 1 | 1 | 1 | 1 | 1 | 1 | 1 | 1 |

*FIG. 12*

*PRIOR ART*

IMAGE FORMING APPARATUS WITH RANDOM NUMBER GENERATOR

BACKGROUND OF THE INVENTION

1. Field of the Invention

The invention relates to an image forming apparatus, specially relates to an image forming apparatus which expresses gray scale data through repeating a plurality of lamp lighting patterns corresponding to different positions.

2. Related Background Art

Conventionally, in an image forming apparatus such as printer with electrophotography and the like, in order to lowly inhibit cost and increase gray scale, through repeating on/off of lighting lamp of plural sub-dots corresponding to different assistant scanning positions, lamp lighting energy corresponding to input gray scale data is expressed. Such technical skill is disclosed in patent document 1 (refer to patent document 1).

Such image forming apparatus comprises a gray scale value inputting register to input gray scale data of n-bits and a dot forming section which forms sub-dots on plural of sub-lines to corresponding to the inputted gray scale value of n-bits received from the gray scale value inputting register. With respect to each sub-line, the dot forming section sets weight factor to corresponding lamp lighting time. That is, with respect to the same sub-line, a fixed weight factor is set. Regarding such example, it will be explained in detail by using drawings.

FIG. 12 is an explanation diagram of inputted gray scale value.

The FIG. 12, as an example, shows gray scale value of 4-bits received by the above-stated conventional image forming apparatus via the gray scale value inputting register. In the FIG. 12, the Y-axis direction indicates an assistant scanning direction, on the most left queue, respective line numbers are shown; and the X-axis direction indicates an main scanning direction, on the highest row, respective pixel numbers on each line are shown; further, on each column, a gray scale value of pixel specified by the corresponding line number and the corresponding pixel number is stated.

The FIG. 12, as an example, shows a case that gray scale values are orderly inputted to the gray scale value inputting register. In the case, as shown by the FIG. 12, at timing of line 1, the gray scale values (1, 1, 1, 1, 1, 1, 1, 1, 1, 1) is inputted; at timing of line 2, the gray scale values (1, 1, 1, 1, 1, 1, 1, 1, 1, 1) is inputted; at timing of line 3, the gray scale values (1, 1, 1, 1, 1, 1, 1, 1, 1, 1) is inputted; at timing of line 4, the gray scale values (13, 13, 13, 13, 13, 13, 13, 13, 13, 13) is inputted; at timing of line 5, the gray scale values (13, 13, 13, 13, 13, 13, 13, 13, 13, 13) is inputted; at timing of line 6, the gray scale values (13, 13, 13, 13, 13, 13, 13, 13, 13, 13) is inputted; at timing of line 7, the gray scale values (1, 1, 1, 1, 1, 1, 1, 1, 1, 1) is inputted; at timing of line 8, the gray scale values (1, 1, 1, 1, 1, 1, 1, 1, 1, 1) is inputted; and at timing of line 9, the gray scale values (1, 1, 1, 1, 1, 1, 1, 1, 1, 1) is inputted.

FIG. 13 is an explanation diagram of a relation between a gray scale value and a standardization exposure energy of each pixel.

The FIG. 13 shows a relation between a gray scale value k (X-axis) and a standardization exposure energy es(k) (Y-axis) with respect to an actual LED printer. Here, the standardization exposure energy es(k) is a 8-bits value, it is obtained through that the image forming apparatus having received the inputted gray scale data standardizes an exposure energy e(k) necessary for realizing the gray scale value k by using a maximum exposure energy E(w) corresponding to one LED pixel, that is, $es(k)=(e(k)/E(w))256$. According to the relation shown by the FIG. 13, with respect to the gray scale value 1 of the above-stated lines 1~3 and lines 7~9, $es(1)=63$, and with respect to the gray scale value 13 of the above-stated lines 4-6, $es(13)=192$, they can be obtained. When using 8-bits of s[0]~s[7] to express these values, the bit data of es(1) becomes [11111100], and the bit data of es(13) becomes [00000011].

FIG. 14 is an explanation diagram of a conventional pixel forming method.

In the FIG. 14, the Y-axis direction indicates an assistant scanning direction, on the most left queue, respective line numbers are shown; and the X-axis direction indicates an main scanning direction, on the highest row, respective pixel numbers on each line are shown. Here, in the assistant scanning direction and the main scanning direction, when they are all set that the pixel is formed by a pitch of $\frac{1}{600}$ inch, 8 sub-lines (0, 1, 2, 3, 4, 5, 6, 7) will be formed in the assistant scanning direction per $\frac{1}{4800}$ inch. The standardization exposure energy es(k) of each pixel is divided into bit data of 8-bits, and they, as sub-dots, are respectively indicated on the 8 sub-lines (0, 1, 2, 3, 4, 5, 6, 7).

With respect to the size (diameter) of sub-dot, in the sub-line 0, a weight factor of 1 is set; in the sub-line 1, a weight factor of 2 is set; in the sub-line 2, a weight factor of 4 is set; in the sub-line 3, a weight factor of 8 is set; in the sub-line 4, a weight factor of 16 is set; in the sub-line 5, a weight factor of 32 is set; in the sub-line 6, a weight factor of 64 is set; and in the sub-line 7, a weight factor of 128 is set. Thus, from the lines 1~3 and 7~9, the above-stated es(1) is indicated, and from the lines 4~6, the above-stated es(13) is indicated. Therefore, when making the size (diameter) of sub-dot correspond to strobe time, on each same sub-line, the strobe time is identically set, and it becomes unnecessary to set strobe time per pixel on the corresponding line. As a result, it also becomes unnecessary to set memory for memorizing strobe time per pixel, then it is possible to lowly inhibit cost and to increase the gray scale of each pixel.

Patent document 1: Japan patent publication 2005-22410.

However, as shown by the FIG. 14, on the one hand, in the border neighborhood of line 3 and line 4, because adjoining sub-dots often happen overlap, so an average density in the main scanning direction becomes high. On the other hand, in the border neighborhood of line 6 and line 7, because adjoining sub-dots do not happen overlap, so an average density in the main scanning direction becomes low. As a result, when macroscopically observing the FIG. 14, as shown on the right side in the FIG. 14, on the border neighborhood of line 3 and line 4, a thin black stripe is happening; and on the border neighborhood of line 6 and line 7, a thin white stripe is happening. That is, in the assistant scanning direction, with respect to such image that rapidly changes from a state close to white level toward a state close to black level, on the border portion, a thin black stripe easily happens; on the contrary, with respect to such image that rapidly changes from a state close to black level toward a state close to white level, on the border portion, a thin white stripe easily happens. Thereby, such problem to be solved is left.

SUMMARY OF THE INVENTION

It is, therefore, an object of the invention to provide an image forming apparatus capable of solving the above problem.

According to the present invention, there is provided an image forming apparatus which expresses lamp lighting energy corresponding to gray scale data on the basis of on/off of lighting lamp of plural dots corresponding to different lamp lighting times of respective different scanning positions, comprising a random number modulation controlling section which, with respect to a lamp lighting energy, executes a random number addition calculation of predetermined level whenever the gray scale data is inputted.

Moreover, in the image forming apparatus, the predetermined level may correspond to the on/off of one dot whose lamp lighting time is shortest in the different lamp lighting times of respective different scanning positions.

Moreover, in the image forming apparatus, the random number modulation controlling section may have a random generator to respectively generate 1 or 0 in a predetermined cycle and a probability of ½.

Moreover, the image forming apparatus may further comprise a modulation control selecting section which, with respect to a composed center position of the lamp lighting energy in plural the dots and a predetermined ideal center position, compares their difference quantities before and after the random number addition calculation, if the difference quantity after the random number addition calculation is bigger than the difference quantity before the random number addition calculation, stops the random number modulation controlling section to operate.

Moreover, in the image forming apparatus, the modulation control selecting section may previously have random number modulation control information as a judgment standard to judge whether the difference quantity after the random number addition calculation is bigger than the difference quantity before the random number addition calculation, per gray scale value of the inputted gray scale data.

Further, according to the present invention, there is also provided an image forming apparatus which executes a light emission control where light emitting elements emit light according to a plurality of gray scale data corresponding to an image, comprising:

a random number calculation controlling section which executes a random number addition calculation of a predetermined range and performs an output per gray scale data; and a light emission controlling section which executes a light emission control of the light emitting elements according to the output of the random number calculation controlling section.

Moreover, in the image forming apparatus, the predetermined range may be a value which corresponds to a shortest lighting-lamp control time of the light emitting elements.

Moreover, in the image forming apparatus, the random number calculation controlling section may add a value of the predetermined range in a probability of ½.

Moreover, the image forming apparatus may further comprise a calculation control selecting section which, when the random number calculation controlling section executes a random number addition calculation with respect to the gray scale data in the predetermined range, if detected that the gray scale data before the random number addition calculation is not in a concentration range previously stored, makes the random number calculation controlling section output the gray scale data without executing the random number addition calculation.

Moreover, in the image forming apparatus, the predetermined range may be a range to indicate one of the plurality of gray scale data; the calculation control selecting section individually performs detection with respect to the plurality of gray scale data.

Furthermore, according to the present invention, there is also provided an image forming apparatus which executes a light emission control where LED elements that are arranged emit light according to a plurality of gray scale data corresponding to an image, and forms a gray scale image, comprising:

a random number calculation controlling section which executes a random number addition calculation of a predetermined range and performs an output per gray scale data; and a light emission controlling section which executes a light emission control of the LED elements according to the output of the random number calculation controlling section.

Moreover, in the image forming apparatus, the predetermined range may be a value which corresponds to a shortest lighting-lamp control time of the LED elements.

Moreover, in the image forming apparatus, the random number calculation controlling section may add a value of the predetermined range in a probability of 1/2.

Moreover, the image forming apparatus may further comprise a calculation control selecting section which, when the random number calculation controlling section executes a random number addition calculation with respect to the gray scale data in the predetermined range, if detected that the gray scale data before the random number addition calculation is not in a concentration range previously stored, makes the random number calculation controlling section output the gray scale data without executing the random number addition calculation.

Moreover, in the image forming apparatus, the predetermined range may be a range to indicate one of the plurality of gray scale data; the calculation control selecting section individually performs detection with respect to the plurality of gray scale data.

The effect of the present invention:

According to the present invention, through providing a random number modulation controlling section and adding a random number to a lamp lighting energy, in the assistant scanning direction, with respect to such image that rapidly changes from a state close to white level toward a state close to black level, or with respect to such image that rapidly changes from a state close to black level toward a state close to white level, it is possible to decrease that a thin white stripe or a thin black stripe happens on the border portion.

The above and other objects and features of the present invention will become apparent from the following detailed description and the appended claims with reference to the accompanying drawings.

BRIEF DESCRIPTION OF THE DRAWINGS

FIG. 3 is a transformation table of standardization exposure energy and sub-dot data;

FIG. 4 is a time chart of LED printer of embodiment 1;

FIG. 5 is a diagram showing an output of random number generator;

FIG. 8 is an explanation diagram of a modulation control selecting table;

FIG. 9 is a time chart of LED printer of embodiment 2;

FIG. 10 is an explanation diagram of inputted gray scale value (second);

FIG. 12 is an explanation diagram of inputted gray scale value (first);

DETAILED DESCRIPTION OF THE PREFERRED EMBODIMENTS

Embodiments of the invention will be described in detail hereinbelow with reference to the drawings.

Embodiment 1

Figure 1:
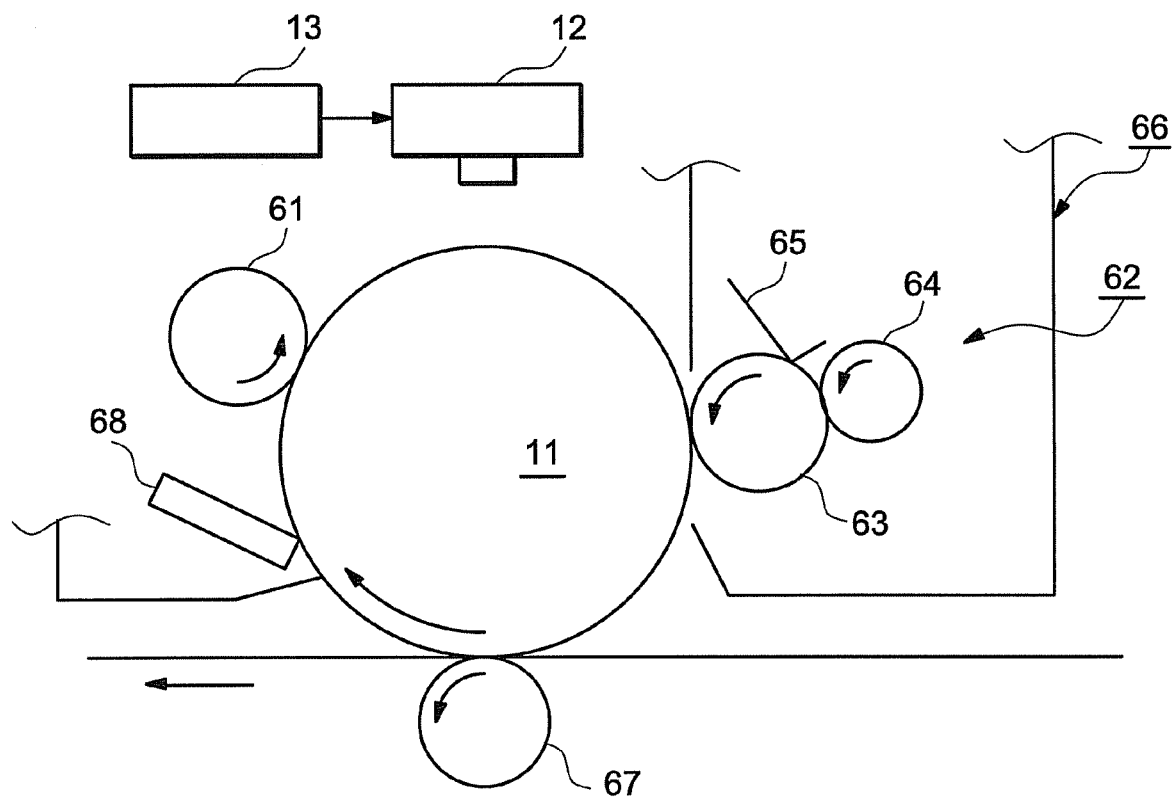
FIG. 1 is a summary diagram showing a LED printer.

FIG. 1 is a summary diagram showing a LED printer.

The FIG. 1, as an example of image forming apparatus according to the present invention, shows a summary side view of main mechanism part of an electrophotography printer.

In the FIG. 1, 11 indicates a photosensitive body drum, which is an image carrying body furnished rotating-freely. 61 indicates a charging roller, which is furnished rotating-freely so as to contact with the photosensitive body drum 11, and is a roller to making the surface of the photosensitive body drum 11 be uniformly charged with negative electric charge. 12 indicates a LED head (which will be explained below in detail again), which is an exposing device for forming an electrostatic latent image on the surface of the photosensitive body drum 11 on the basis of DATA signal received from a print controlling section.

13 indicates a print controlling section (which will be explained below in detail again), which is a part to receive image data from a host apparatus (not shown), and generate print data, then send out the print data as DATA signal to the LED head 12. 62 indicates a developing device, which has a developing roller 63, a sponge roller 64, a developing blade 65 and a toner cartridge 66, and is a part to form a toner image as a visible image on the surface of the photosensitive body drum 11. 67 indicates a transferring roller, which is rotating-freely furnished so as to contact with the photosensitive body drum 11, and transfers the toner image formed on the photosensitive body drum 11 onto a predetermined record medium. 68 is a cleaning blade, which is rotating-freely furnished so as to contact with the photosensitive body drum 11, and is a blade to remove toner remaining on the surface of the photosensitive body drum 11.

Figure 2:
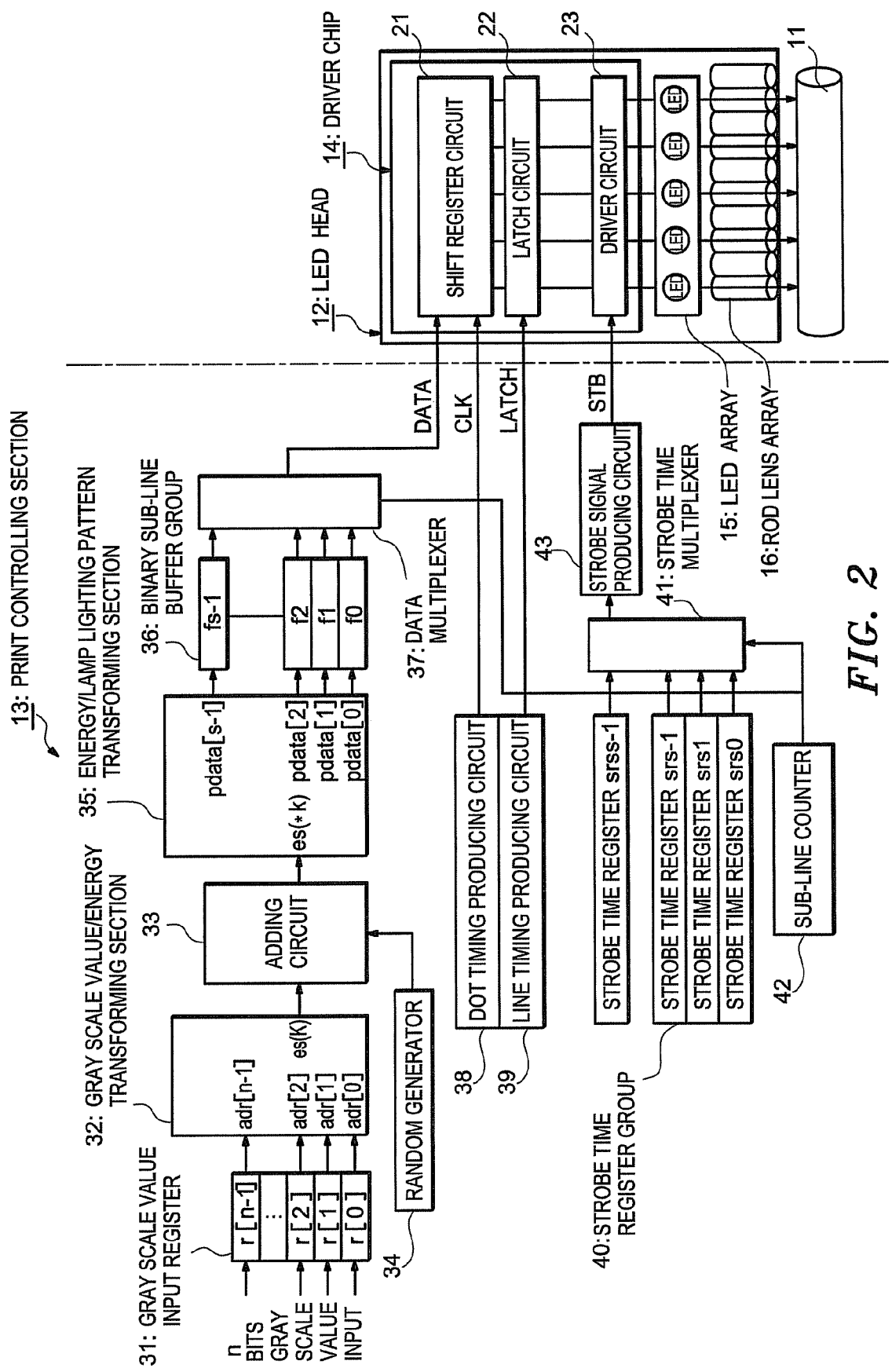
FIG. 2 is a block diagram showing a print controlling section and a structure of LED head of embodiment 1.

FIG. 2 is a block diagram showing a print controlling section and a structure of LED head of embodiment 1.

As shown by the FIG. 2, the print controlling section 13 includes a gray scale value input register 31, a gray scale value/energy transforming section 32, an adding circuit 33, a random generator 34, an energy/lamp lighting pattern transforming section 35, a binary sub-line buffer group 36, a data multiplexer 37, a dot timing producing circuit 38, a line timing producing circuit 39, a strobe time register group 40, a strobe time multiplexer 41, a sub-line counter 42, and a strobe signal producing circuit 43.

The gray scale value input register 31 has n registers from r[0] to r[n−1], and it is a part to receive a n-bits gray scale value corresponding to each pixel from a host apparatus (not shown). The gray scale value/energy transforming section 32 receives the n-bits gray scale value (adr[0]~adr[n−1]) from the gray scale value input register 31, and transforms the n-bits gray scale value (adr[0]~adr[n−1]) into the standardization exposure energy es(k), then sends out the standardization exposure energy es(k) to the adding circuit 33. Here, the standardization exposure energy es(k), as stated above, is a 8-bits value, it is obtained through that the image forming apparatus having received the inputted gray scale data standardizes an exposure energy e(k) necessary for realizing the gray scale value k by using a maximum exposure energy E(w) corresponding to one LED pixel, that is, es(k)=(e(k)/E(w)) 256.

Figure 13:
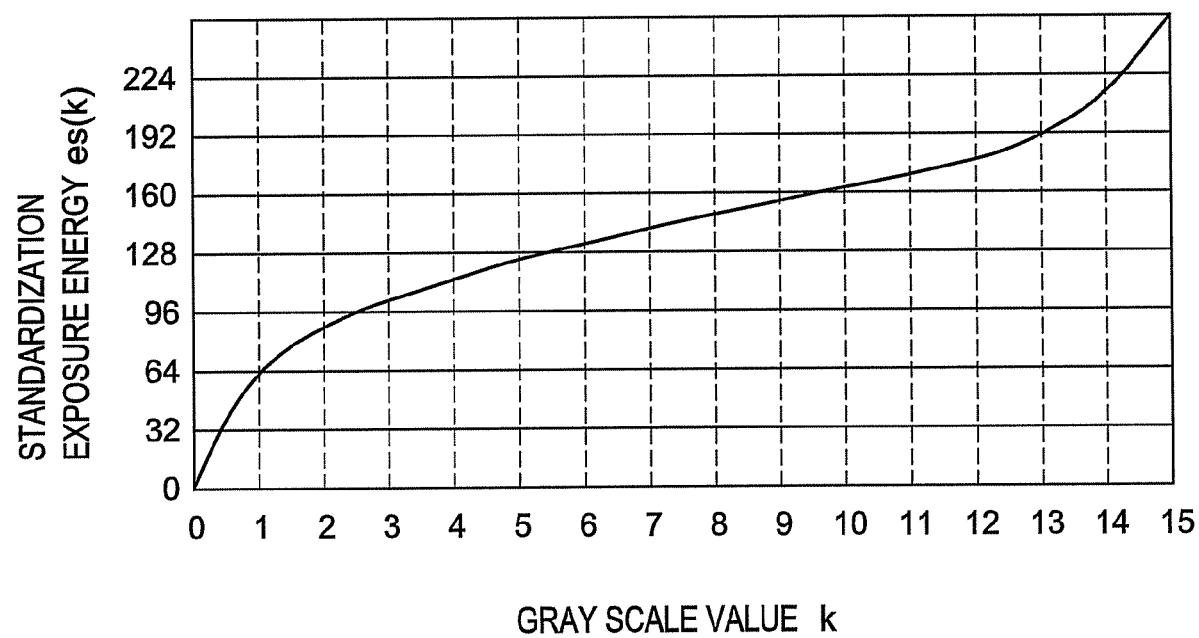
FIG. 13 is an explanation diagram showing a relation between gray scale value and standardization exposure energy of each pixel.

The transformation from the n-bits gray scale value (adr[0]~adr[n−1]) to the standardization exposure energy es(k) is executed through that the gray scale value/energy transforming section 32 uses the relation shown by the FIG. 13 as an example. The relation between the gray scale value k and the standardization exposure energy es(k) is shown by a curve in the FIG. 13 and is obtained by previously using a corresponding LED printer, receiving a gray scale value k of 4-bits (an example), measuring an exposure energy e(k) and finding a standardization exposure energy es(k). the gray scale value/energy transforming section 32, on the basis of the curve, receives the gray scale value k from the gray scale value input register 31, then transforms the gray scale value k into the standardization exposure energy es(k) expressed by value of 0~256, and outputs the standardization exposure energy es(k) to the adding circuit 33.

The adding circuit 33 receives the standardization exposure energy es(k) from the gray scale value/energy transforming section 32, further receives a random number signal α from the random generator 34, then adds the standardization exposure energy es(k) to the random number signal α, and sends out the addition result serving as a random number addition standardization exposure energy es*(k) to the energy/lamp lighting pattern transforming section 35. Here, α is a random number value received from the random generator 34, and it is 0 or 1. the random generator 34 is a circuit to generate a predetermined random number and output it to the adding circuit 33.

The energy/lamp lighting pattern transforming section 35 is a part to receive the random number addition standardization exposure energy es*(k) from the adding circuit 33, divide it to sub-lines 0~s−1, and send out the divided values serving as sub-dot data pdata [0]~[s−1] of respective sub-lines 0~s−1 to binary sub-line buffer group 36. The transformation from the random number addition standardization exposure energy es*(k)(es*(k)=es(k)+α) into the pdata [0]~[s−1] of the respective sub-lines 0~s−1 is executed as stated below.

FIG. 3 is a transformation table of standardization exposure energy and sub-dot data.

In the FIG. 3, on the first queue, as an example, 4-bits gray scale value k is stated. On the second queue, a value of the standardization exposure energy es(k) corresponding the gray scale value k is stated. The value expresses the value of X-axis and the value of Y-axis in FIG. 13 by a correct numerical value. Further, on the queues from third to ninth, a bit string is stated which is obtained by dividing the value of the standardization exposure energy es(k) stated on the second queue to the sub-lines 0~7. Here, the sub-line 0 is provided with a weight factor of 1; the sub-line 1 is provided with a weight factor of 2; the sub-line 2 is provided with a weight factor of 4; the sub-line 3 is provided with a weight factor of 8; the sub-line 4 is provided with a weight factor of 16; the sub-line 5 is provided with a weight factor of 32; the sub-line 6 is provided with a weight factor of 64; and the sub-line 7 is provided with a weight factor of 128.

The energy/lamp lighting pattern transforming section 35 according to the table (the value in the table is not added by random number), as an example, divides the random number addition 10 standardization exposure energy es*(k) into 8-bits, and transforms them into sub-dot data corresponding to sub-dots formed on the 8 sub-lines. The sub-dot data server as the sub-dot data pdata [0]~[s−1] added random number, are sent out to the binary sub-line buffer group 36.

The binary sub-line buffer group 36 has s binary sub-line buffers from f0 to fs−1, these buffers sequentially receive the sub-dot data pdata [0]~[s−1] from the energy/lamp lighting pattern transforming section 35, and store bit data of one main scanning line part.

The data multiplexer 37, on the basis of an instruction of the sub-line counter 42, synchronously with clock signal CLK, reads out the sub-dot data of one sub-line, that are stored in the binary sub-line buffer group 36, and outputs them as data signal DATA to a shift register circuit 21. the dot timing producing circuit 38 is a circuit to make the sub-dot data shift synchronously with clock signal CLK. The line timing producing circuit 39 is a circuit to generate a latch signal LATCH and output it to a latch circuit 22.

The strobe time register group 40 is a register group to previously store strobe times corresponding to the sub-lines 0~s−1. The strobe time multiplexer 41 is a part to, read out predetermined strobe times stored in the strobe time register group 40 on the basis of an instruction of the sub-line counter 42 and send it to the strobe signal producing circuit 43. The sub-line counter 42 is a counter to orderly specify the sub-lines 0~s−1. The strobe signal producing circuit 43 is a part to, on the basis of the strobe times received from the strobe time multiplexer 41, generate a strobe signal and send it to a driver circuit 23.

The above-stated LED head 12 has a driver chip 14, a LED array 15 consisting of a plurality of LED elements, and a rod lens array 16 to converge the light emitted from the LED array 15 onto the surface of the photosensitive body drum 11. Further, the driver chip 14 has the shift register circuit 21, the latch circuit 22, and driver circuit 23.

The shift register circuit 21 is a circuit to be synchronous with clock signal CLK generated by the dot timing producing circuit 38 and orderly receive the data signal DATA from the data multiplexer 37. The latch circuit 22 is a circuit for receiving sub-dot data of one sub-line part from the shift register circuit 21 to corresponding to the timing of latch signal LATCH produced by the line timing producing circuit 39. The driver circuit 23 is a circuit to receive the strobe signal STB from the strobe signal producing circuit 43, and during the strobe time corresponding to the sub-lines 0~s−1, flow a strobe electricity to a gate on which the sub-dot data is at high level (1).

Next is to explain regarding operations of a LED printer in the embodiment by using time chart.

Figure 4:
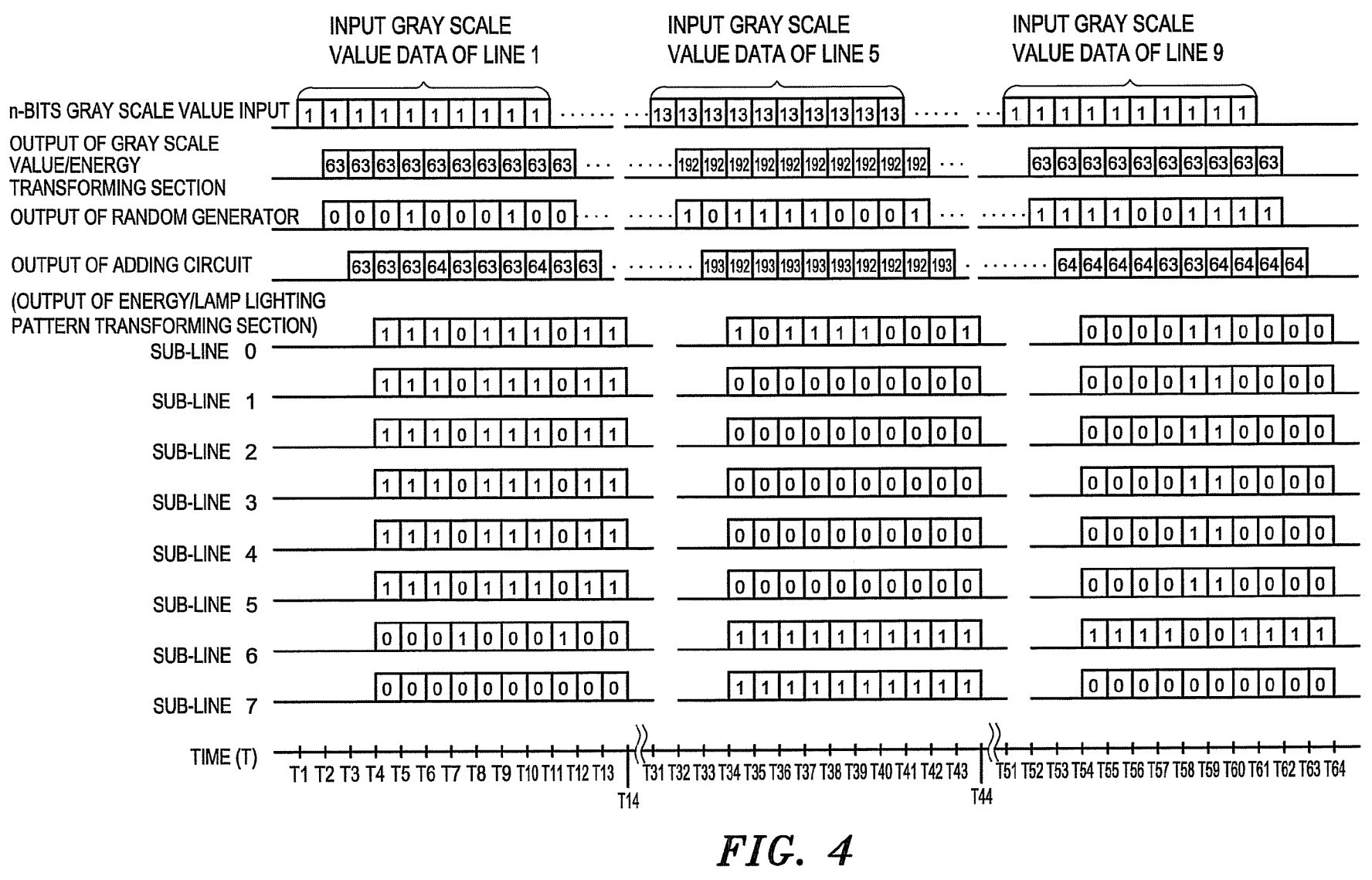

FIG. 4 is a time chart of LED printer of embodiment 1.

In the FIG. 4, from top to bottom, a n-bits gray scale value input; an output of gray scale value/energy transforming section 32; an output of random generator 34; an output of adding circuit 33; and an output of energy/lamp lighting pattern transforming section 35 from sub-line 1 to sub-line 7 are orderly shown. At the lowest bottom of the FIG. 4, a time passage in a horizontal axis direction used in common for respective items is shown.

The following explanation is regarding decided premise conditions of operation.

Premise Condition (1)

It is set that the n-bits gray scale value input (FIG. 2) is equal to the value stated in the FIG. 12.

Premise Condition (2)

It is set that the transformation from n-bits (n=4) gray scale value into standardization exposure energy es(k) is executed by the gray scale value/energy transforming section 32 (FIG. 2) on the basis of the relation shown by the FIG. 13.

FIG. 5 is a diagram showing an output of random number generator.

On the most left queue, line numbers of main scanning line are shown; on the highest row, pixel numbers on the main scanning line are shown; and in the respective columns, random number values added to pixel specified by the line number and the pixel number are shown.

Premise Condition (3)

It is set that the output of the random generator 34 are the values in the FIG. 5.

Premise Condition (4)

It is set that the output of the energy/lamp lighting pattern transforming section 35 is 8-bits data (according to the FIG. 3) corresponding to the sub-lines 0~7.

The following is to explain operations of LED printer on the basis of the above-stated premise conditions with respect to line 1 (time T1~time T13), line 5 (time T31~time T43), and line 9 (time T51~time T63) as an example.

Time T1

An input of gray scale values (1, 1, 1, 1, 1, 1, 1, 1, 1, 1) of line 1 shown by FIG. 12 to the gray scale value input register 31 (FIG. 2) is started.

Time T2

The gray scale value/energy transforming section 32 receives the gray scale values (1, 1, 1, 1, 1, 1, 1, 1, 1, 1) of line 1 according to a pixel order, and starts to transforms it into a standardization exposure energy es(k) on the basis of the relation shown by the FIG. 13. Here, because the gray scale value k is 1, through referring to the FIG. 13, the standardization exposure energy es(k) is 63. At the same time, the random generator 34 (FIG. 2) outputs 0 (FIG. 5).

Time T3

The adding circuit 33 (FIG. 2) receives the standardization exposure energy es(k)=63 from the gray scale value/energy transforming section 32, further receives a random number 0 corresponding to pixel X1 of line 1 from the random generator 34, then adds the standardization exposure energy es(k) to the random number 0, and sends out a random number addition standardization exposure energy es*(k)=63 to the energy/lamp lighting pattern transforming section 35. At the same time, the random generator 34 (FIG. 2) outputs 0 (FIG. 5).

Time T4

The energy/lamp lighting pattern transforming section 35 receives the random number addition standardization exposure energy es*(k)=63 from the adding circuit 33, divides it to sub-lines 0~7, and sends out the divided values serving as sub-dot data pdata [0]~[7] of respective sub-lines 0~7 to binary sub-line buffer group 36. According to the table shown by FIG. 3, the random number addition standardization exposure energy es*(k)=63 is transformed into pdata [0]~pdata [7] [11111100], and the pdata [0]~pdata [7] [11111100] are stored in the binary sub-line buffers from f0 to f7.

Time T5~Time T6

Because all the gray scale values of the line 1 consist of 1 and the random generator 34 (FIG. 2) outputs 0 during the time T3~time T4, so the energy/lamp lighting pattern transforming section 35, in the same way as the time 4, stores the pdata [0]~pdata [7] [11111100] to the corresponding binary sub-line buffers from f0 to f7.

Time T7

Because all the gray scale values of the line 1 consist of 1 and the random generator 34 (FIG. 2) outputs 1 at the time T5, so the adding circuit 33 outputs a random number addition standardization exposure energy es*(k)=64 at the time T6.

Therefore, the energy/lamp lighting pattern transforming section 35 (FIG. 2) receives the random number addition standardization exposure energy es*(k)=64 from the adding circuit 33, divides it to sub-lines 0~7, and sends out the divided values serving as sub-dot data pdata [0]~[7] of respective sub-lines 0~7 to binary sub-line buffer group 36. Here, according to the table shown by FIG. 3, the random number addition standardization exposure energy es*(k)=64 is transformed into pdata [0]~pdata [7] [00000011], and the pdata [0]~pdata [7] [00000011] are stored in the binary sub-line buffers from f0 to f7.

Time T8~Time T10

Because all the gray scale values of the line 1 consist of 1 and the random generator 34 (FIG. 2) outputs 0 during the time T6~time T8, so the energy/lamp lighting pattern transforming section 35, in the same way as the time T4, stores the pdata [0]~pdata [7] [11111100] to the corresponding binary sub-line buffers from f0 to f7.

Time T11

Because all the gray scale values of the line 1 consist of 1 and the random generator 34 (FIG. 2) outputs 1 at the time T9, so the energy/lamp lighting pattern transforming section 35, in the same way as the time T7, stores the pdata [0]~pdata [7] [00000011] to the corresponding binary sub-line buffers from f0 to f7.

Time T12~Time T13

Because all the gray scale values of the line 1 consist of 1 and the random generator 34 (FIG. 2) outputs 0 during the time T10~time T11, so the energy/lamp lighting pattern transforming section 35, in the same way as the time T4, stores the pdata [0]~pdata [7] [11111100] to the corresponding binary sub-line buffers from f0 to f7.

Time T31

An input of gray scale values (13, 13, 13, 13, 13, 13, 13, 13, 13, 13) of line 5 shown by FIG. 12 to the gray scale value input register 31 (FIG. 2) is started.

Time T32

The gray scale value/energy transforming section 32 (FIG. 2) receives the gray scale values (13, 13, 13, 13, 13, 13, 13, 13, 13, 13) of line 5 according to a pixel order, and starts to transforms it into a standardization exposure energy es(k) on the basis of the relation shown by the FIG. 13. Here, because the gray scale value k is 13, through referring to the FIG. 13, the standardization exposure energy es(k) is 192. At the same time, the random generator 34 (FIG. 2) outputs 1 (FIG. 5).

Time T33

The adding circuit 33 (FIG. 2) receives the standardization exposure energy es(k)=192 from the gray scale value/energy transforming section 32, further receives a random number 1 corresponding to pixel X1 of line 5 from the random generator 34, then adds the standardization exposure energy es(k) to the random number 0, and sends out a random number addition standardization exposure energy es*(k)=193 to the energy/lamp lighting pattern transforming section 35. At the same time, the random generator 34 (FIG. 2) outputs 0 (FIG. 5).

Time T34

The energy/lamp lighting pattern transforming section 35 (FIG. 2) receives the random number addition standardization exposure energy es*(k)=193 from the adding circuit 33, divides it to sub-lines 0~7, and sends out the divided values serving as sub-dot data pdata [0]~sub-dot data pdata [7] of respective sub-lines 0~7 to binary sub-line buffer group 36. Here, according to the table shown by FIG. 3, the random number addition standardization exposure energy es*(k)=193 is transformed into pdata [0]~pdata [7] [10000011], and the pdata [0]~pdata [7] [10000011] are stored in the binary sub-line buffers from f0 to f7.

Time T35

Because all the gray scale values of the line 5 consist of 13 and the random generator 34 (FIG. 2) outputs 0 at the time T33, so the adding circuit 33 (FIG. 2) sends out a random number addition standardization exposure energy es*(k)=192 to the energy/lamp lighting pattern transforming section 35 at the time T34. Therefore, the energy/lamp lighting pattern transforming section 35 (FIG. 2) receives the random number addition standardization exposure energy es*(k)=192 from the adding circuit 33, divides it to sub-lines 0~7, and sends out the divided values serving as sub-dot data pdata [0]~sub-dot data pdata [7] of respective sub-lines 0~7 to binary sub-line buffer group 36. Here, according to the table shown by FIG. 3, the random number addition standardization exposure energy es*(k)=192 is transformed into pdata [0]~pdata [7] [00000011], and the pdata [0]~pdata [7] [00000011] are stored in the binary sub-line buffers from f0 to f7.

Time T36~Time T39

Because all the gray scale values of the line 5 consist of 13 and the random generator 34 (FIG. 2) outputs 1 during the time T34~time T37, so the energy/lamp lighting pattern transforming section 35, in the same way as the time T34, stores the pdata [0]~pdata [7] [10000011] to the corresponding binary sub-line buffers from f0 to f7.

Time T40~Time T42

Because all the gray scale values of the line 5 consist of 13 and the random generator 34 (FIG. 2) outputs 0 during the time T38~time T40, so during the time T40~time T42, the energy/lamp lighting pattern transforming section 35, in the same way as the time T35, stores the pdata [0]~pdata [7] [00000011] to the corresponding binary sub-line buffers from f0 to f7.

Time T43

Because all the gray scale values of the line 5 consist of 13 and the random generator 34 (FIG. 2) outputs 1 at the time T41, so during the time T43, the energy/lamp lighting pattern transforming section 35, in the same way as the time T34, stores the pdata [0]~pdata [7] [10000011] to the corresponding binary sub-line buffers from f0 to f7.

Time T51

An input of gray scale values (1, 1, 1, 1, 1, 1, 1, 1, 1, 1) of line 9 shown by FIG. 12 to the gray scale value input register 31 (FIG. 2) is started.

Time T52

The gray scale value/energy transforming section 32 receives the gray scale values (1, 1, 1, 1, 1, 1, 1, 1, 1, 1) of line 9 according to a pixel order, and starts to transforms it into a standardization exposure energy es(k) on the basis of the relation shown by the FIG. 13. Here, because the gray scale value k is 1, through referring to the FIG. 13, the standardization exposure energy es(k) is 63. At the same time, the random generator 34 (FIG. 2) outputs 1 (FIG. 5).

Time T53

The adding circuit 33 (FIG. 2) receives the standardization exposure energy es(k)=63 from the gray scale value/energy transforming section 32, further receives a random number 1 corresponding to pixel X1 of line 9 from the random generator 34, then adds the standardization exposure energy es(k) to the random number 0, and sends out a random number addition standardization exposure energy es*(k)=64 to the energy/lamp lighting pattern transforming section 35.

Time T54

The energy/lamp lighting pattern transforming section 35 receives the random number addition standardization exposure energy es*(k)=64 from the adding circuit 33, divides it to sub-lines 0~7, and sends out the divided values serving as sub-dot data pdata [0]~[7] of respective sub-lines 0~7 to binary sub-line buffer group 36. Here, according to the table shown by FIG. 3, the random number addition standardization exposure energy es*(k)=64 is transformed into pdata [0]~pdata [7] [00000010], and the pdata [0]~pdata [7] [00000010] are stored in the binary sub-line buffers from f0 to f7.

Time T55~Time T57

Because all the gray scale values of the line 9 consist of 1 and the random generator 34 (FIG. 2) outputs 1 during the time T53~time T55, so during the time T55~time T57, the energy/lamp lighting pattern transforming section 35, in the same way as the time 54, stores the pdata [0]~pdata [7] [00000010] to the corresponding binary sub-line buffers from f0 to f7.

Time T58

Because all the gray scale values of the line 9 consist of 1 and the random generator 34 (FIG. 2) outputs 0 at the time T56, so the adding circuit 33 outputs a random number addition standardization exposure energy es*(k)=63 at the time T57. Therefore, the energy/lamp lighting pattern transforming section 35 (FIG. 2) receives the random number addition standardization exposure energy es*(k)=63 from the adding circuit 33, divides it to sub-lines 0~7, and sends out the divided values serving as sub-dot data pdata [0]~[7] of respective sub-lines 0~7 to binary sub-line buffer group 36. Here, according to the table shown by FIG. 3, the random number addition standardization exposure energy es*(k)=63 is transformed into pdata [0]~pdata [7] [11111100], and the pdata [0]~pdata [7] [11111100] are stored in the binary sub-line buffers from f0 to f7.

Time T59

Because all the gray scale values of the line 9 consist of 1 and the random generator 34 (FIG. 2) outputs 0 at the time T57, so at the time T59, the energy/lamp lighting pattern transforming section 35, in the same way as the time T58, stores the pdata [0]~pdata [7] [11111100] to the corresponding binary sub-line buffers from f0 to f7.

Time T60~time T63

Because all the gray scale values of the line 9 consist of 1 and the random generator 34 (FIG. 2) outputs 1 during the time T60~time T63, so the energy/lamp lighting pattern transforming section 35, in the same way as the time T54, stores the pdata [0]~pdata [7] [00000010] to the corresponding binary sub-line buffers from f0 to f7.

With respect to the line 2 and line 3, in the same way as the line 1, their corresponding respective values are stored to the binary sub-line buffers from f0 to f7; with respect to the line 4 and line 6, in the same way as the line 5, their corresponding respective values are stored to the binary sub-line buffers from f0 to f7; and with respect to the line 7 and line 8, in the same way as the line 9, their corresponding respective values are stored to the binary sub-line buffers from f0 to f7.

Figure 6:
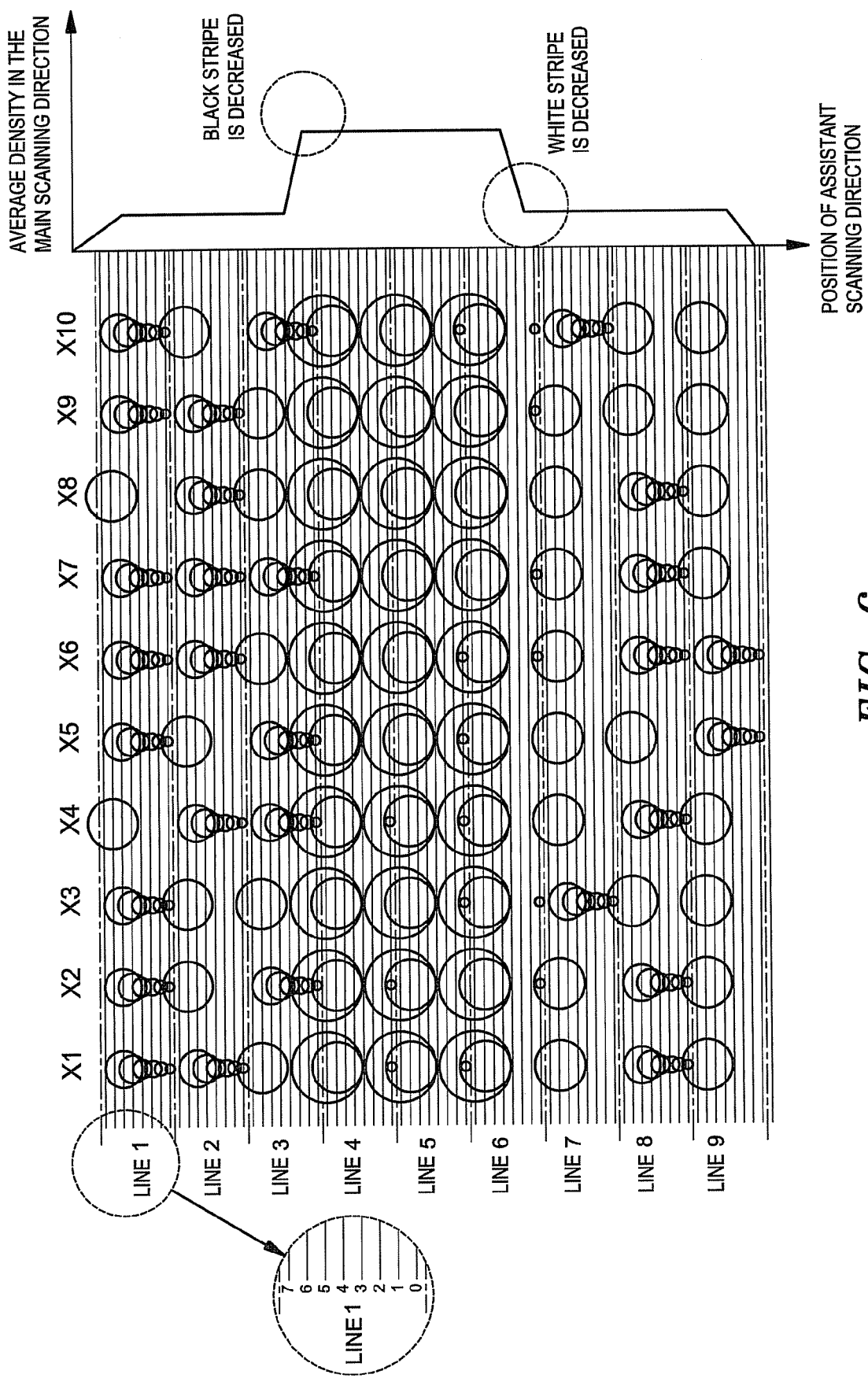
FIG. 6 is an explanation diagram for explaining a gray scale pixel forming method of embodiment 1.

FIG. 6 is an explanation diagram for explaining a gray scale pixel forming method of embodiment 1.

The FIG. 6 is an image drawing when the values stored in the binary sub-line buffers from f0 to f7 in the above-stated operation explanation are outputted and printed. In the FIG. 6, the Y-axis direction indicates an assistant scanning direction, on the most left queue, respective line numbers are shown; and the X-axis direction indicates an main scanning direction, on the highest row, respective pixel numbers on each line are shown. Here, in the assistant scanning direction and the main scanning direction, when they are all set that the pixel is formed by a pitch of 1/600 inch, 8 sub-lines (0, 1, 2, 3, 4, 5, 6, 7) will be formed in the assistant scanning direction per 1/4800 inch. The standardization exposure energy es(k) of each pixel is divided into bit data of 8-bits, and they, as sub-dots, are respectively indicated on the 8 sub-lines (0, 1, 2, 3, 4, 5, 6, 7).

With respect to the size (diameter) of sub-dot, in the sub-line 0, a weight factor of 1 is set; in the sub-line 1, a weight factor of 2 is set; in the sub-line 2, a weight factor of 4 is set; in the sub-line 3, a weight factor of 8 is set; in the sub-line 4, a weight factor of 16 is set; in the sub-line 5, a weight factor of 32 is set; in the sub-line 6, a weight factor of 64 is set; and in the sub-line 7, a weight factor of 128 is set. Thus, from the lines 1~3 and 7~9, the above-stated es(1) is indicated, and from the lines 4~6, the above-stated es(13) is indicated.

Figure 14:
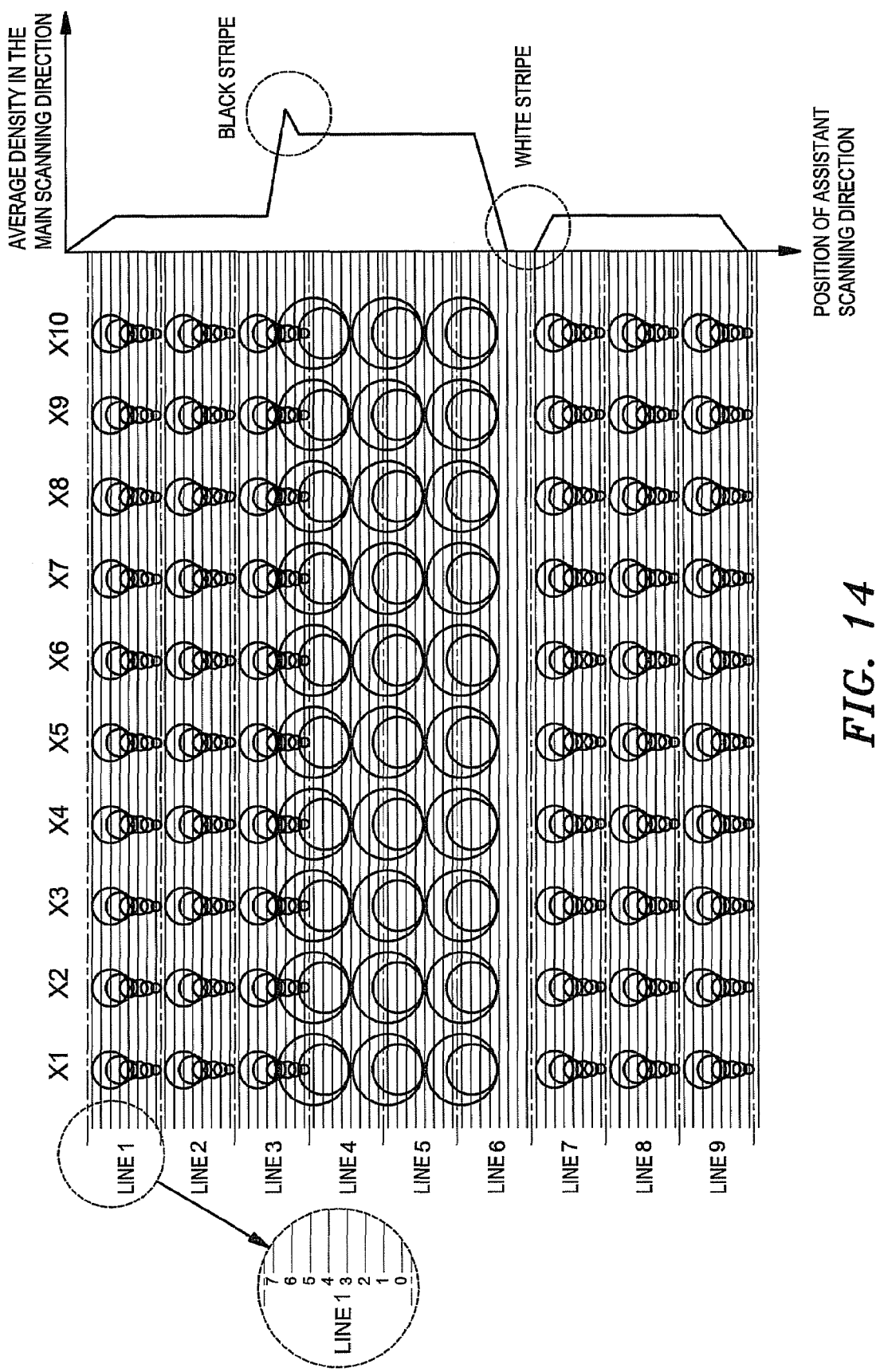
FIG. 14 is an explanation diagram for explaining a conventional gray scale pixel forming method.

As compared with the above-stated FIG. 14, on the one hand, in the border neighborhood of line 3 and line 4, the overlap of adjoining sub-dots is decreased. On the other hand, in the border neighborhood of line 6 and line 7, there is a little overlap of adjoining sub-dots. As a result, when macroscopically observing the FIG. 6, we can see that: as shown on the right side in the FIG. 6, on the border neighborhood of line 3 and line 4, the occurrence of black stripe is decreased; and on the border neighborhood of line 6 and line 7, the occurrence of white stripe is decreased.

That is, in the embodiment, through providing a random generator and an adding circuit 33 and adding a random number (0 or 1) to a standardization exposure energy es(k), in the assistant scanning direction, with respect to such image that rapidly changes from a state close to white level toward a state close to black level, or with respect to such image that rapidly changes from a state close to black level toward a state close to white level, it is possible to decrease that a white stripe or a black stripe happens on the border portion.

Embodiment 2

In the above-stated embodiment 1, one dot on the main scanning line is constructed by composing a plurality of sub-dot formed on plural sub-lines their positions are different in the assistant scanning direction. In the composition of the sub-dots, only the value of the standardization exposure energy es(k) is taken notice. However, the positions of the plurality of sub-dots in the assistant scanning direction are respectively different, therefore, according to the bit structure of the sub-dot, such case also possibly happens that: before and after the random number addition calculation, the center positions of the standardization exposure energy es(k) of the composed sub-dots become greatly different. In the embodiment, there is an object to remove an abuse (as an example, in the output image, there is a black stripe being so noticeable) caused by the change of the center position of the standardization exposure energy es(k) of the composed sub-dots.

Figure 7:
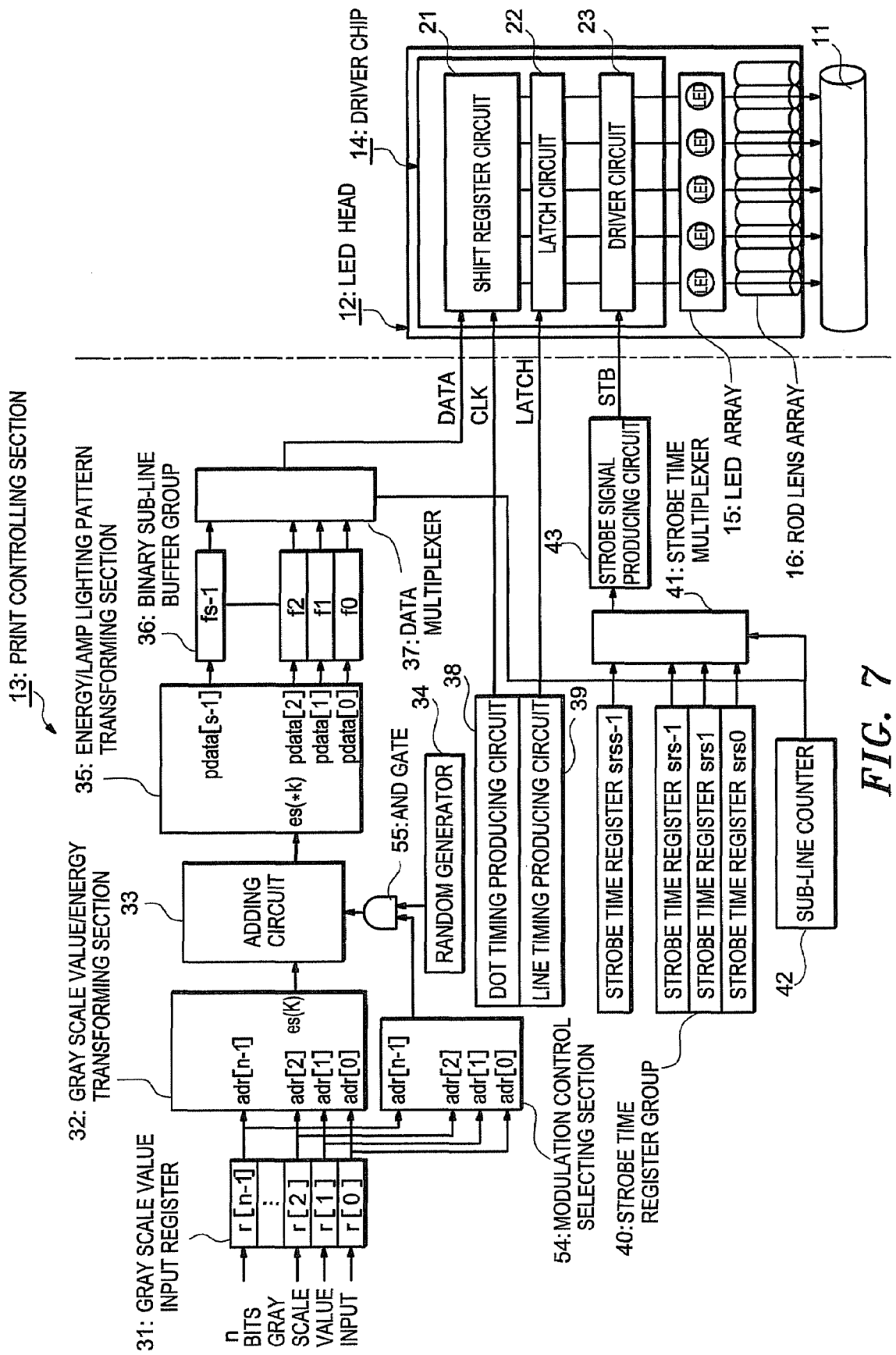
FIG. 7 is a block diagram showing a print controlling section and a structure of LED head of embodiment 2.

FIG. 7 is a block diagram showing a print controlling section and a structure of LED head of embodiment 2.

As shown by the FIG. 7, the print controlling section 53 includes a gray scale value input register 31, a gray scale value/energy transforming section 32, an adding circuit 33, a random generator 34, an energy/lamp lighting pattern transforming section 35, a binary sub-line buffer group 36, a data multiplexer 37, a dot timing producing circuit 38, a line timing producing circuit 39, a strobe time register group 40, a strobe time multiplexer 41, a sub-line counter 42, a strobe signal producing circuit 43, a modulation control selecting section 54, and an AND gate 55. The following is only to explain the part different from the embodiment 1 in detail.

Regarding the same part as the embodiment 1, the same symbols are assigned and their explanations are omitted.

The modulation control selecting section 54 is a part, with respect to a center position of the standardization exposure energy es(k) of composed sub-dots and a predetermined ideal center position, compares their difference quantities before and after the random number addition calculation, if the difference quantity after the random number addition calculation is bigger than the difference quantity before the random number addition calculation, stop the random number addition calculation for the gray scale value k. In order to realize such function, the modulation control selecting section 54 has a modulation control selection table for judging whether a random number addition calculation control with respect to the gray scale value k is suitable; if it is judged that the gray scale value k inputted from the gray scale value input register 31 is suitable for random number addition calculation control, sends a modulation control necessary signal (high level) to the AND gate 55; if it is judged that the gray scale value k inputted from the gray scale value input register 31 is not suitable for random number addition calculation control, sends a modulation control unnecessary signal to the AND gate 55. the following is to explain in detail the contents of the modulation control selection table.

FIG. 8 is an explanation diagram of modulation control selecting table.

In the FIG. 8, the queue 54-1 shows a gray scale value k. Here, as an example, there are gray scales of 16 of 4-bits. The queue 54-2 shows a value of the standardization exposure energy es(k). The value is obtained to correspond to the gray scale value k, on the basis of the relation shown by above-stated FIG. 13. The queue 54-3 shows a center position Wk of energy of respective standardization exposure energy es(k)s in the assistant scanning direction. The center position Wk is found from a lamp lighting state (1 or 0) of sub-dot when dividing the standardization exposure energy es(k) into 8 sub-lines (as an example); a weight factor of sub-line; and respective distances from sub-line 0 to center positions of respective sub-bits (Here, the interval of respective sub-lines is set to 1). That is, Wk=Σ(weight factor of sub-line n×assistant scanning position of sub-line n×lamp lighting state of sub-bit)/Σ(weight factor of sub-line n×lamp lighting state of sub-bit). The numerical formula is well known and it is obtained by utilizing an expression to request a gravity center of a rigid body (Here, a center position of energy) having a predetermined partial density (Here, weight factor).

The queue 54-5 shows a center position Wk* in the assistant scanning direction when the standardization exposure energy es(k)s is plussed 1 (es(k)+1). The center position Wk* is found as the above-stated Wk. The queue 54-6 shows a difference quantity (absolute value) of Wk on the basis of a predetermined ideal center position Wave (Here, as an example, it is set to 1.95), that is, shows |Wave−Wk|. The queue 54-7 shows a difference quantity (absolute value) of Wk* on the basis of a predetermined ideal center position Wave, i.e. |Wave−Wk*|. The queue 54-8 shows whether the modulation control is necessary. That is, when the |Wave−Wk*| is bigger than |Wave−Wk|, it is set that the modulation control is unnecessary (×); and when the |Wave−Wk*| is smaller than |Wave−Wk|, it is set that the modulation control is necessary (O).

The AND gate 55 is a gate which output +1 to the adding circuit 33 only when received +1 from both of the modulation control selecting section 54 and the random generator 34. Regarding other parts, because they are the same as the embodiment 1, so their explanation are omitted. The following is to explain operations of the embodiment 2 through a time chart.

Figure 9:
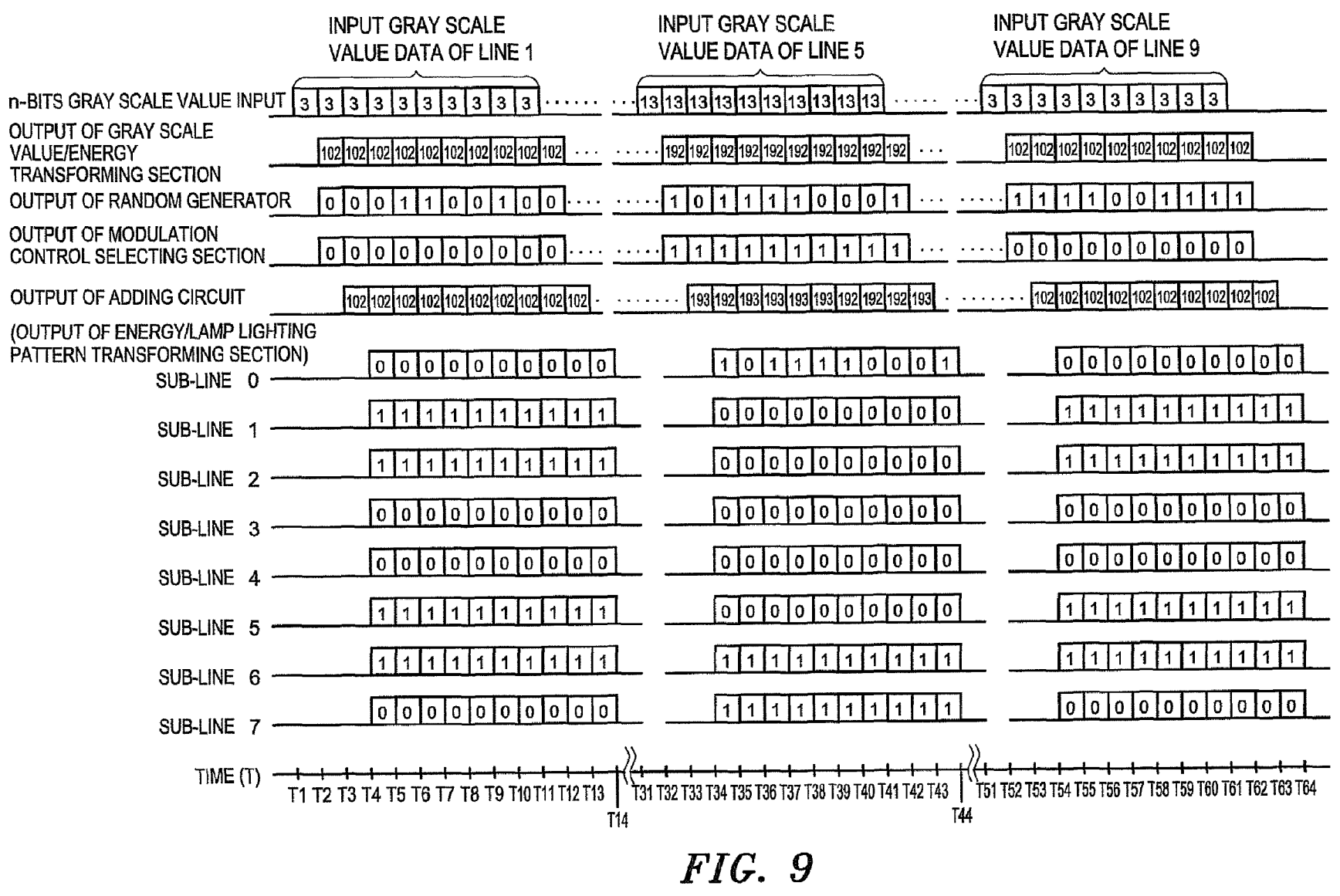

FIG. 9 is a time chart of LED printer of embodiment 2.

In the FIG. 9, from top to bottom, a n-bits gray scale value input; an output of gray scale value/energy transforming section 32; an output of random generator 34; an output of modulation control selecting section 54; an output of adding circuit 33; and an output of energy/lamp lighting pattern transforming section 35 from sub-line 1 to sub-line 7 are orderly shown. At the lowest bottom of the FIG. 9, a time passage in a horizontal axis direction used in common for respective items is shown.

FIG. 10 is an explanation diagram of inputted gray scale value (second).

The FIG. 10, as an example, shows gray scale value of 4-bits received by the image forming apparatus in the embodiment 2 via the gray scale value inputting register. In the FIG. 10, the Y-axis direction indicates an assistant scanning direction, on the most left queue, respective line numbers are shown; and the X-axis direction indicates an main scanning direction, on the highest row, respective pixel numbers on each line are shown; further, on each column, a gray scale value of pixel specified by the corresponding line number and the corresponding pixel number is stated.

The FIG. 10, as an example, shows a case that gray scale values are orderly inputted to the gray scale value inputting register.

In the case, as shown by the FIG. 10, at timing of line 1, the gray scale values (3, 3, 3, 3, 3, 3, 3, 3, 3, 3) is inputted; at timing of line 2, the gray scale values (3, 3, 3, 3, 3, 3, 3, 3, 3, 3) is inputted; at timing of line 3, the gray scale values (3, 3, 3, 3, 3, 3, 3, 3, 3, 3) is inputted; at timing of line 4, the gray scale values (13, 13, 13, 13, 13, 13, 13, 13, 13, 13) is inputted; at timing of line 5, the gray scale values (13, 13, 13, 13, 13, 13, 13, 13, 13, 13) is inputted; at timing of line 6, the gray scale values (13, 13, 13, 13, 13, 13, 13, 13, 13, 13) is inputted; at timing of line 7, the gray scale values (3, 3, 3, 3, 3, 3, 3, 3, 3, 3) is inputted; at timing of line 8, the gray scale values (3, 3, 3, 3, 3, 3, 3, 3, 3, 3) is inputted; and at timing of line 9, the gray scale values (3, 3, 3, 3, 3, 3, 3, 3, 3, 3) is inputted.

The following explanation is regarding decided premise conditions of operation.

Premise Condition (1)

It is set that the n-bits gray scale value input (FIG. 7) is equal to the value stated in the FIG. 10.

Premise Condition (2)

It is set that the transformation from n-bits (n=4) gray scale value into standardization exposure energy es(k) is executed by the gray scale value/energy transforming section 32 (FIG. 7) on the basis of the relation shown by the FIG. 13.

Premise Condition (3)

It is set that the modulation control selecting section 54 (FIG. 7) is to judge whether a modulation control is necessary on the basis of the modulation control selection table shown by the FIG. 8.

Premise Condition (4)

It is set that the output of the random generator 34 are the values in the FIG. 5.

Premise Condition (5)

It is set that the output of the energy/lamp lighting pattern transforming section 35 (FIG. 7) is 8-bits data (according to the FIG. 3) corresponding to the sub-lines 0~7.

The following is to explain operations of LED printer on the basis of the above-stated premise conditions with respect to line 1 (time T1~time T13), line 5 (time T31~time T43), and line 9 (time T51~time T63) as an example.

Time T1

An input of gray scale values (3, 3, 3, 3, 3, 3, 3, 3, 3, 3) of line 1 shown by FIG. 10 to the gray scale value input register 31 (FIG. 7) is started.

Time T2

The gray scale value/energy transforming section 32 receives the gray scale values (3, 3, 3, 3, 3, 3, 3, 3, 3, 3) of line 1 according to a pixel order, and starts to transforms it into a standardization exposure energy es(k) on the basis of the relation shown by the FIG. 13. Here, because the gray scale value k is 3, through referring to the FIG. 13, the standardization exposure energy es(k) is 102. The modulation control selecting section 54 (FIG. 7) outputs a modulation control unnecessary signal (0) according to that the gray scale value k is 3. At the same time, the random generator 34 (FIG. 7) outputs 0 (FIG. 5).

Time T3

The adding circuit 33 (FIG. 7) receives the standardization exposure energy es(k)=102 from the gray scale value/energy transforming section 32, and receives 0 from the AND gate 55 which receives a random number 0 corresponding to pixel X1 of line 1 from the random generator 34 (FIG. 7), then adds the standardization exposure energy es(k) to the output 0 of the AND gate 55, and sends out a random number addition standardization exposure energy es*(k)=102 to the energy/lamp lighting pattern transforming section 35.

Time T4

The energy/lamp lighting pattern transforming section 35 (FIG. 7) receives the random number addition standardization exposure energy es*(k)=102 from the adding circuit 33, divides it to sub-lines 0~7, and sends out the divided values serving as sub-dot data pdata [0]~[7] of respective sub-lines 0~7 to binary sub-line buffer group 36. According to the table shown by FIG. 3, the random number addition standardization exposure energy es*(k)=102 is transformed into pdata [0]~pdata [7] [01100110], and the pdata [0]~pdata [7] [01100110] are stored in the binary sub-line buffers from f0 to f7.

Time T5~Time T13

Because all the gray scale values of the line 1 consist of 3, the random generator 34 (FIG. 7) outputs 1 at the time T5 and at the time T9, but all outputs of the modulation control selecting section 54 (FIG. 7) are 0, so the energy/lamp lighting pattern transforming section 35 (FIG. 7), in the same way as the time 4, stores the pdata [0]~pdata [7] [01100110] to the corresponding binary sub-line buffers from f0 to f7.

Time T31

An input of gray scale values (13, 13, 13, 13, 13, 13, 13, 13, 13, 13) of line 5 shown by FIG. 12 to the gray scale value input register 31 (FIG. 7) is started.

Time T32

The gray scale value/energy transforming section 32 (FIG. 7) receives the gray scale values (13, 13, 13, 13, 13, 13, 13, 13, 13, 13) of line 5 according to a pixel order, and starts to transforms it into a standardization exposure energy es(k) on the basis of the relation shown by the FIG. 13. Here, because the gray scale value k is 13, through referring to the FIG. 13, the standardization exposure energy es(k) is 192. At the same time, the random generator 34 (FIG. 7) outputs 1 (FIG. 5).

Time T33

The adding circuit 33 (FIG. 7) receives the standardization exposure energy es(k)=192 from the gray scale value/energy transforming section 32 (FIG. 7), further, because the gray scale value k is 13, so the modulation control selecting section 54 outputs a modulation control necessary signal, and the AND gate 55 receives a random number 1 (FIG. 5) corresponding to pixel X1 of line 5 from the random generator 34 (FIG. 7). Then the adding circuit 33 adds the standardization exposure energy es(k) to the output 1 of the AND gate 55, and sends out a random number addition standardization exposure energy es*(k)=193 to the energy/lamp lighting pattern transforming section 35.

Time T34

The energy/lamp lighting pattern transforming section 35 (FIG. 7) receives the random number addition standardization exposure energy es*(k)=193 from the adding circuit 33 (FIG. 7), divides it to sub-lines 0~7, and sends out the divided values serving as sub-dot data pdata [0]~sub-dot data pdata [7] of respective sub-lines 0~7 to binary sub-line buffer group 36. Here, according to the table shown by FIG. 3, the random number addition standardization exposure energy es*(k)=193 is transformed into pdata [0]~pdata [7] [10000011], and the pdata [0]~pdata [7] [10000011] are stored in the binary sub-line buffers from f0 to f7.

Time T35

Because all the gray scale values of the line 5 consist of 13, the modulation control selecting section 54 outputs a modulation control necessary signal (1) according to that the gray scale value k is 13. Because the random generator 34 (FIG. 7) outputs 0 at the time T33, so the adding circuit 33 (FIG. 7) sends out a random number addition standardization exposure energy es*(k)=192 (es(k)+α) to the energy/lamp lighting pattern transforming section 35 at the time T34. Therefore, the energy/lamp lighting pattern transforming section 35 (FIG. 7) receives the random number addition standardization exposure energy es*(k)=192 from the adding circuit 33, divides it to sub-lines 0~7, and sends out the divided values serving as sub-dot data pdata [0]~sub-dot data pdata [7] of respective sub-lines 0~7 to binary sub-line buffer group 36. Here, according to the table shown by FIG. 3, the random number addition standardization exposure energy es*(k)=192 is transformed into pdata [0]~pdata [7] [00000011], and the pdata [0]~pdata [7] [00000011] are stored in the binary sub-line buffers from f0 to f7.

Time T36~Time T39

Because all the gray scale values of the line 5 consist of 13, and the modulation control selecting section 54 (FIG. 7) outputs a modulation control necessary signal (1) according to that the gray scale value k is 13, further the random generator 34 (FIG. 7) outputs 1 during the time T34~time T37, so during the time T36~time T39, the energy/lamp lighting pattern transforming section 35 (FIG. 7), in the same way as the time T34, stores the pdata [0]~pdata [7] [10000011] to the corresponding binary sub-line buffers from f0 to f7.

Time T40~Time T42

Because all the gray scale values of the line 5 consist of 13, and the modulation control selecting section 54 (FIG. 7) outputs a modulation control necessary signal (1) according to that the gray scale value k is 13, further the random generator 34 (FIG. 7) outputs 0 during the time T38~time T40, so during the time T40~time T42, the energy/lamp lighting pattern transforming section 35, in the same way as the time T35, stores the pdata [0]~pdata [7] [00000011] to the corresponding binary sub-line buffers from f0 to f7.

Time T43

Because all the gray scale values of the line 5 consist of 13, and the modulation control selecting section 54 (FIG. 7) outputs a modulation control necessary signal (1) according to that the gray scale value k is 13, further the random generator 34 (FIG. 7) outputs 1 at the time T41, so during the time T43, the energy/lamp lighting pattern transforming section 35, in the same way as the time T34, stores the pdata [0]~pdata [7] [10000011] to the corresponding binary sub-line buffers from f0 to f7.

Time T51

An input of gray scale values (3, 3, 3, 3, 3, 3, 3, 3, 3, 3) of line 9 shown by FIG. 10 to the gray scale value input register 31 (FIG. 7) is started.

Time T52

The gray scale value/energy transforming section 32 receives the gray scale values (3, 3, 3, 3, 3, 3, 3, 3, 3, 3) of line 9 according to a pixel order, and starts to transforms it into a standardization exposure energy es(k) on the basis of the relation shown by the FIG. 13. Here, because the gray scale value k is 3, through referring to the FIG. 13, the standardization exposure energy es(k) is 102. So the modulation control selecting section 54 (FIG. 7) outputs a modulation control unnecessary signal (0) according to that the gray scale value k is 3. At the same time, the random generator 34 (FIG. 7) outputs 0 (FIG. 5).

Time T53

The adding circuit 33 (FIG. 7) receives the standardization exposure energy es(k)=102 from the gray scale value/energy transforming section 32, further receives 0 from the AND gate 55, then adds them, and sends out a random number addition standardization exposure energy es*(k)=102 to the energy/lamp lighting pattern transforming section 35.

Time T54

The energy/lamp lighting pattern transforming section 35 receives the random number addition standardization exposure energy es*(k)=102 from the adding circuit 33, divides it to sub-lines 0~7, and sends out the divided values serving as sub-dot data pdata [0]~[7] of respective sub-lines 0~7 to binary sub-line buffer group 36. Here, according to the table shown by FIG. 3, the random number addition standardization exposure energy es*(k)=102 is transformed into pdata [0]~pdata [7] [01100110], and the pdata [0]~pdata [7] [01100110] are stored in the binary sub-line buffers from f0 to f7.

Time T55~Time T63

Because all the gray scale values of the line 9 consist of 3 and the random generator 34 (FIG. 7) outputs 1 during the time T52~time T55 and during the time T58~time T61, but the modulation control selecting section 54 (FIG. 7) always outputs a modulation control unnecessary signal (0), so the energy/lamp lighting pattern transforming section 35, in the same way as the time 54, stores the pdata [0]~pdata [7] [01100110] to the corresponding binary sub-line buffers from f0 to f7.

Figure 11:
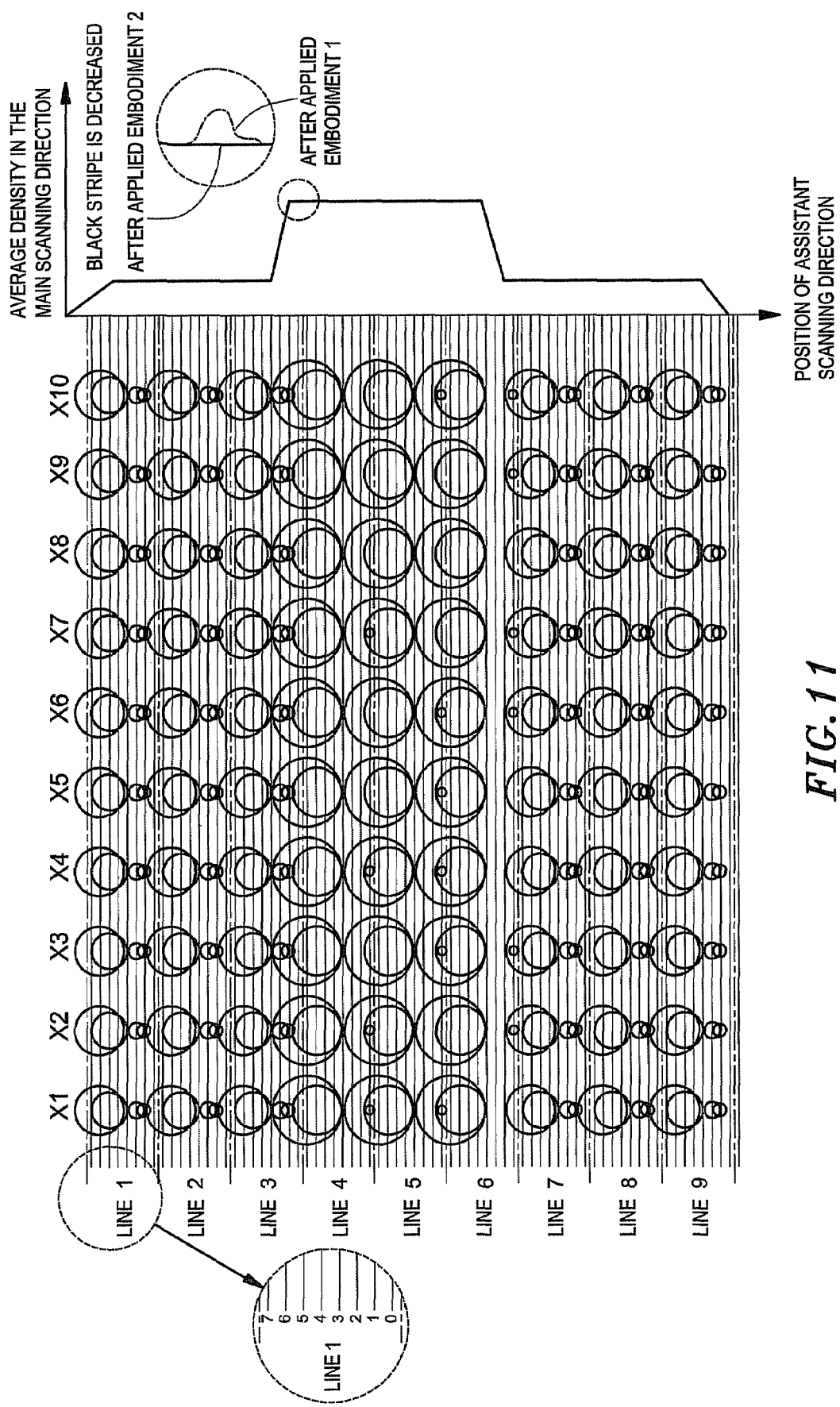
FIG. 11 is an explanation diagram for explaining a gray scale pixel forming method of embodiment 2.

FIG. 11 is an explanation diagram for explaining a gray scale pixel forming method of embodiment 2.

The FIG. 11 is an image drawing when the values stored in the binary sub-line buffers from f0 to f7 in the above-stated operation explanation are outputted and printed. In the FIG. 11, the Y-axis direction indicates an assistant scanning direction, on the most left queue, respective line numbers are shown; and the X-axis direction indicates an main scanning direction, on the highest row, respective pixel numbers on each line are shown. Here, in the assistant scanning direction and the main scanning direction, when they are all set that the pixel is formed by a pitch of 1/600 inch, 8 sub-lines (0, 1, 2, 3, 4, 5, 6, 7) will be formed in the assistant scanning direction per 1/4800 inch. The standardization exposure energy es(k) of each pixel is divided into bit data of 8-bits, and they, as sub-dots, are respectively indicated on the 8 sub-lines (0, 1, 2, 3, 4, 5, 6, 7).

With respect to the size (diameter) of sub-dot, in the sub-line 0, a weight factor of 1 is set; in the sub-line 1, a weight factor of 2 is set; in the sub-line 2, a weight factor of 4 is set; in the sub-line 3, a weight factor of 8 is set; in the sub-line 4, a weight factor of 16 is set; in the sub-line 5, a weight factor of 32 is set; in the sub-line 6, a weight factor of 64 is set; and in the sub-line 7, a weight factor of 128 is set. Thus, from the lines 1~3 and 7~9, the above-stated es(3) is indicated, and from the lines 4~6, the above-stated es(13) is indicated.

As compared with the above-stated FIG. 6, in the border neighborhood of line 3 and line 4, the overlap of adjoining sub-dots is further decreased than the embodiment 1. As a result, when macroscopically observing the FIG. 11, we can see that: as shown on the right side in the FIG. 11, on the border neighborhood of line 3 and line 4, the occurrence of black stripe is decreased. That is, in the embodiment, through adding a modulation control selecting section 54 into the structure of the embodiment 1, it is possible to remove an abuse (as an example, in the output image, there is a black stripe being so noticeable) caused by the change of the center position of the standardization exposure energy es(k) of the composed sub-dots.

The utilization possibility on industry:

As stated above, the case to apply the present invention to the printer is explained, but it also can be applied to other apparatus such as facsimile apparatus, copying apparatus and the like.

The present invention is not limited to the foregoing embodiments but many modifications and variations are possible within the spirit and scope of the appended claims of the invention.

What is claimed is:

1. An image forming apparatus which provides lamp lighting energies corresponding to gray scale data by turning lighting lamps that produce plural dots at different scanning positions on and off with different lamp lighting times, comprising:

a random number modulation controlling section which, with respect to each of said lamp lighting energies, executes a random number addition calculation within a predetermined range whenever said gray scale data is inputted; and a modulation control selecting section which, with respect to a composed center position of said lamp lighting energies in plural said dots and a predetermined ideal center position, compares their difference quantities before and after said random number addition calculation, and if one of said difference quantities after said random number addition calculation is bigger than said one of said difference quantities before said random number addition calculation, stops said random number modulation controlling section from operating, so that the random number is not added to the respective lamp lighting energy.

2. The image forming apparatus according to claim 1, wherein said modulation control selecting section previously has random number modulation control information as a judgment standard to judge whether said one of said difference quantities after said random number addition calculation is bigger than said one of said difference quantities before said random number addition calculation, per gray scale value of said inputted gray scale data.

3. The image forming apparatus according to claim 1, wherein said predetermined range corresponds to turning on and off of one dot whose lamp lighting time is shortest of said different lamp lighting times.

4. The image forming apparatus according to claim 3, wherein said random number modulation controlling section has a random generator to respectively generate 1 or 0 in a predetermined cycle and a probability of 1/2.

5. An image forming apparatus which provides lamp lighting energies corresponding to gray scale data by turning lighting lamps that produce plural dots at different scanning positions on and off with different lamp lighting times, comprising:
- a random number modulation controlling section which, with respect to each of said lamp lighting energies, executes a random number addition calculation within a predetermined range whenever said gray scale data is inputted; and
- a modulation control selecting section which, with respect to a composed center position of said lamp lighting energies in plural said dots and a predetermined ideal center position, compares their difference quantities before and after said random number addition calculation, and if one of said difference quantities after said random number addition calculation is bigger than said one of said difference quantities before said random number addition calculation, stops said random number modulation controlling section from operating, so that the random number is not added to the respective lamp lighting energy,
- wherein said predetermined range corresponds to turning on and off of one dot whose lamp lighting time is shortest of said different lamp lighting times.

6. The image forming apparatus according to claim 5, wherein said modulation control selecting section previously has random number modulation control information as a judgment standard to judge whether said difference quantity after said random number addition calculation is bigger than said difference quantity before said random number addition calculation, per gray scale value of said inputted gray scale data.

7. The image forming apparatus according to claim 5, wherein said predetermined range is a value which corresponds to a shortest lighting-lamp control time of said light emitting elements.

8. The image forming apparatus according to claim 5, wherein said random number calculation controlling section adds a value of said predetermined range in a probability of 1/2.

9. An image forming apparatus which executes light emission control where light emitting elements emit light according to a plurality of gray scale data corresponding to an image, comprising:
- a random number calculation controlling section which selectively executes a random number addition calculation within a predetermined range and provides an output per said gray scale data;
- a light emission controlling section which executes said light emission control of said light emitting elements according to said output of said random number calculation controlling section; and
- a calculation control selecting section which, when said random number calculation controlling section executes a random number addition calculation with respect to said gray scale data in said predetermined range, if it is detected that said gray scale data before said random number addition calculation is not in a concentration range previously stored, makes said random number calculation controlling section output said gray scale data without executing said random number addition calculation, so that the random number is not added to the respective lamp lighting energy.

10. The image forming apparatus according to claim 9,
- wherein said predetermined range is a range to indicate one of said plurality of gray scale data, and
- wherein said calculation control selecting section individually performs detection with respect to said plurality of gray scale data.

11. An image forming apparatus which executes light emission control where Light Emitting Device (LED) elements emit light according to a plurality of gray scale data corresponding to an image, and form a gray scale image, comprising:
- a random number calculation controlling section which selectively executes a random number addition calculation within a predetermined range and provides an output per said gray scale data;
- a light emission controlling section which executes said light emission control of said LED elements according to said output of said random number calculation controlling section; and
- a calculation control selecting section which, when said random number calculation controlling section executes a random number addition calculation with respect to said gray scale data in said predetermined range, if it is detected that said gray scale data before said random number addition calculation is not in a concentration range previously stored, makes said random number calculation controlling section output said gray scale data without executing said random number addition calculation, so that the random number is not added to the respective lamp lighting energy.

12. The image forming apparatus according to claim 11,
- wherein said predetermined range is a range to indicate one of said plurality of gray scale data, and
- wherein said calculation control selecting section individually performs detection with respect to said plurality of gray scale data.

13. The image forming apparatus according to claim 11,
- wherein said predetermined range is a value which corresponds to a shortest lighting-lamp control time of said LED elements.

14. The image forming apparatus according to claim 11,
- wherein said random number calculation controlling section adds a value of said predetermined range in a probability of 1/2.

* * * * *